Nov. 17, 1964

C. W. PRIDGEON ETAL 3,157,295

HAY BALE ACCUMULATOR

Filed Dec. 19, 1962

INVENTORS.
CLIFFORD W. PRIDGEON
M. LEE GUSTAFSON
WILLIAM L. HUTTNER
TIM LUND
BY
Merchant, Merchant & Gould
ATTORNEYS Nov. 17, 1964
C. W. PRIDGEON ETAL
3,157,295
HAY BALE ACCUMULATOR
Filed Dec. 19, 1962
6 Sheets-Sheet 2
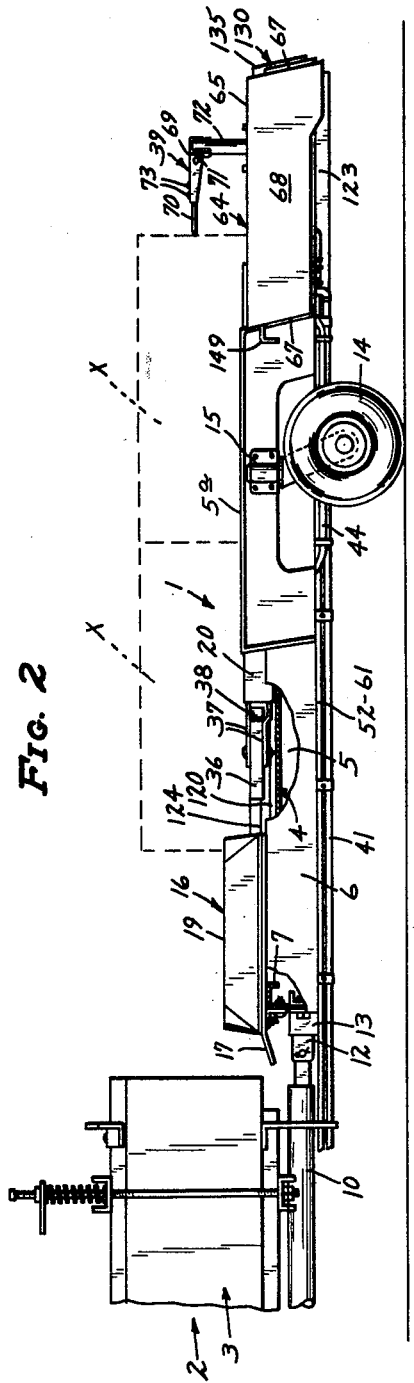
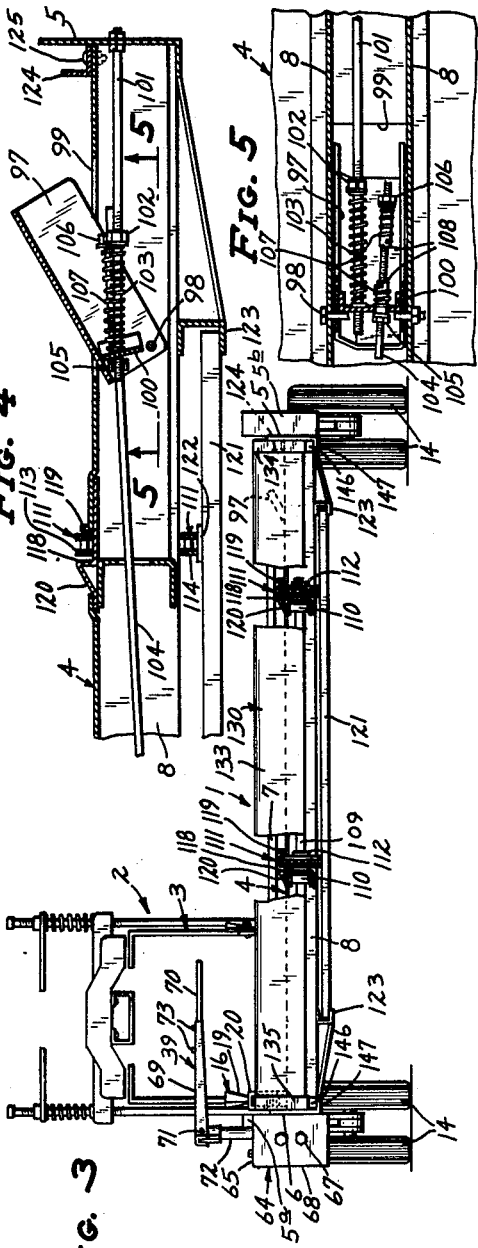
INVENTORS.
CLIFFORD W. PRIDGEON
M. LEE GUSTAFSON
WILLIAM L. HUTTNER
TIM LUND
BY
Merchant, Merchant & Gould
ATTORNEYS

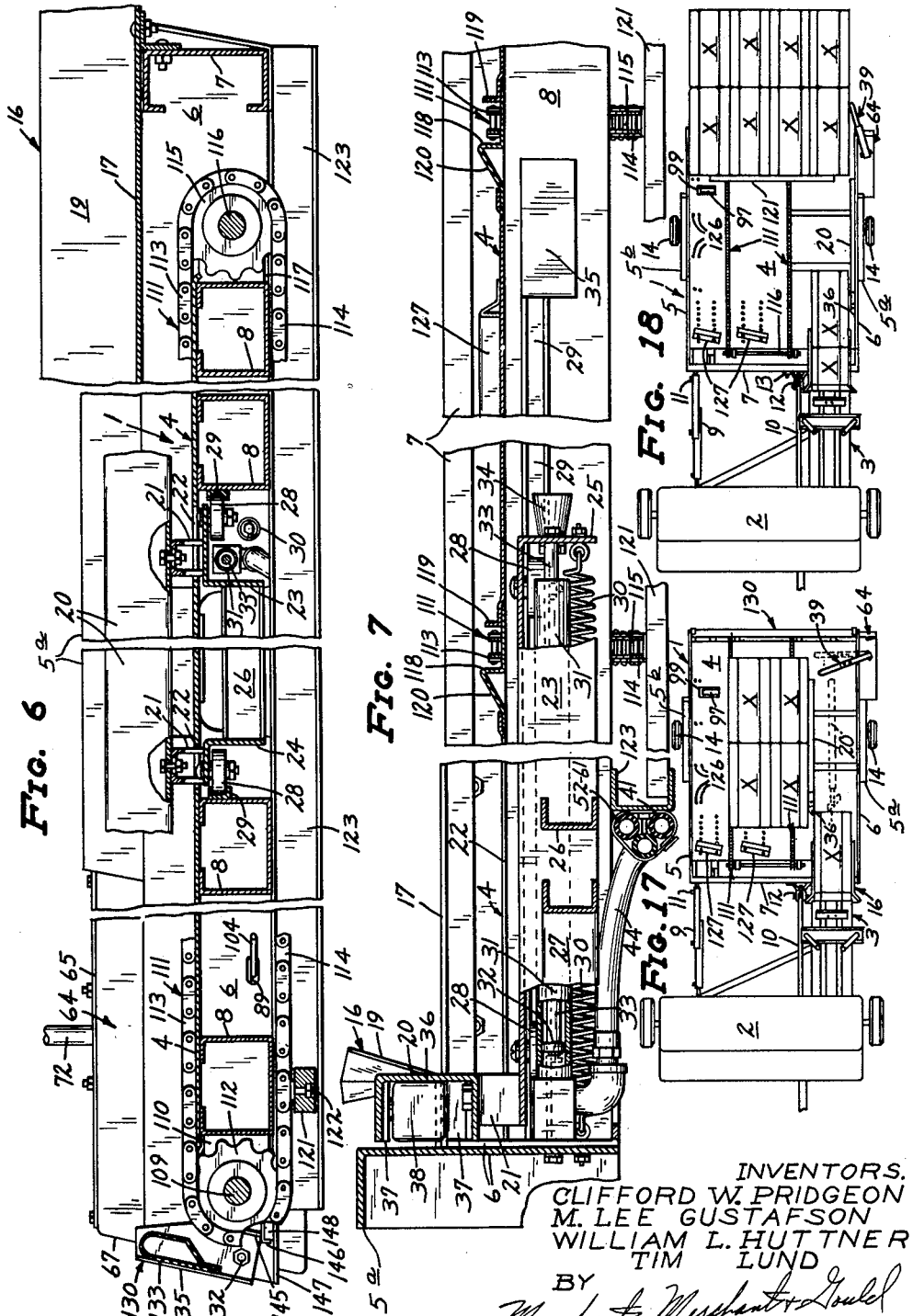

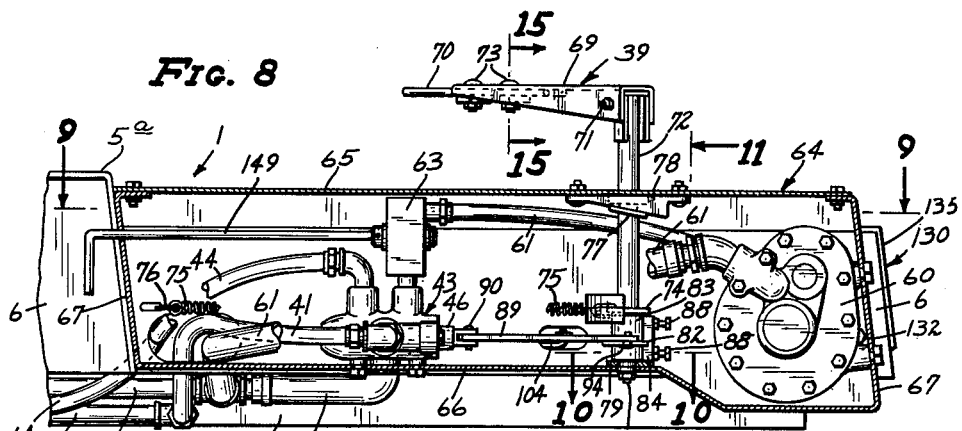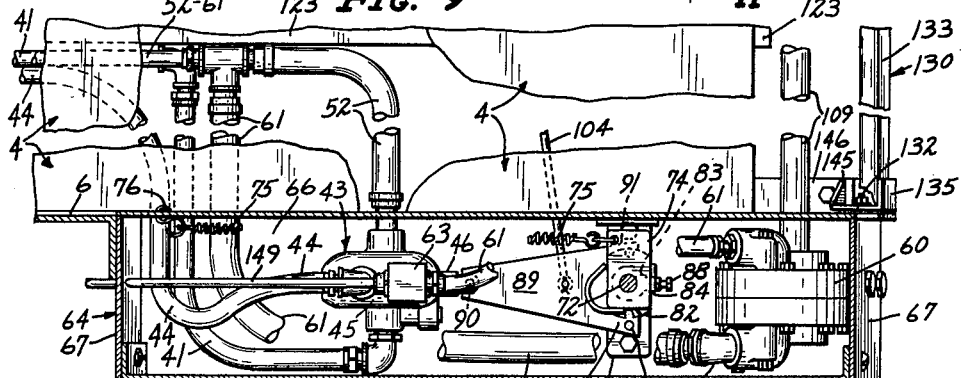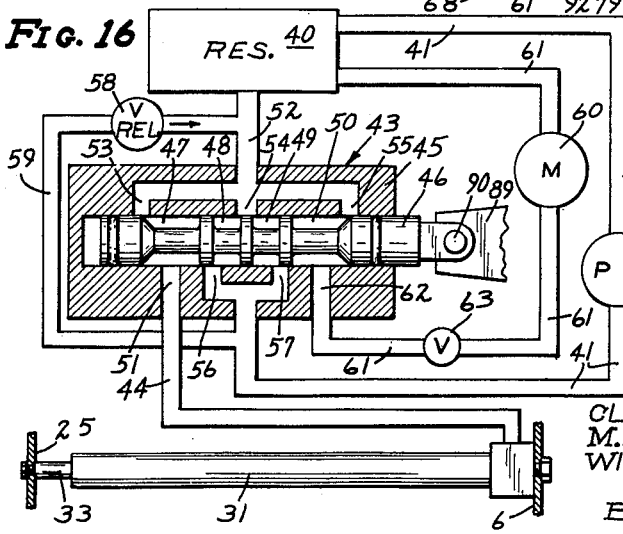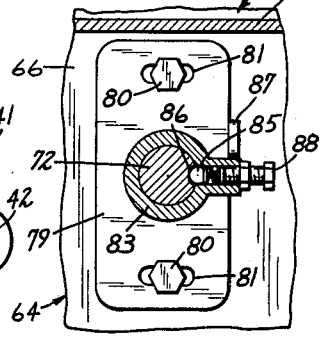

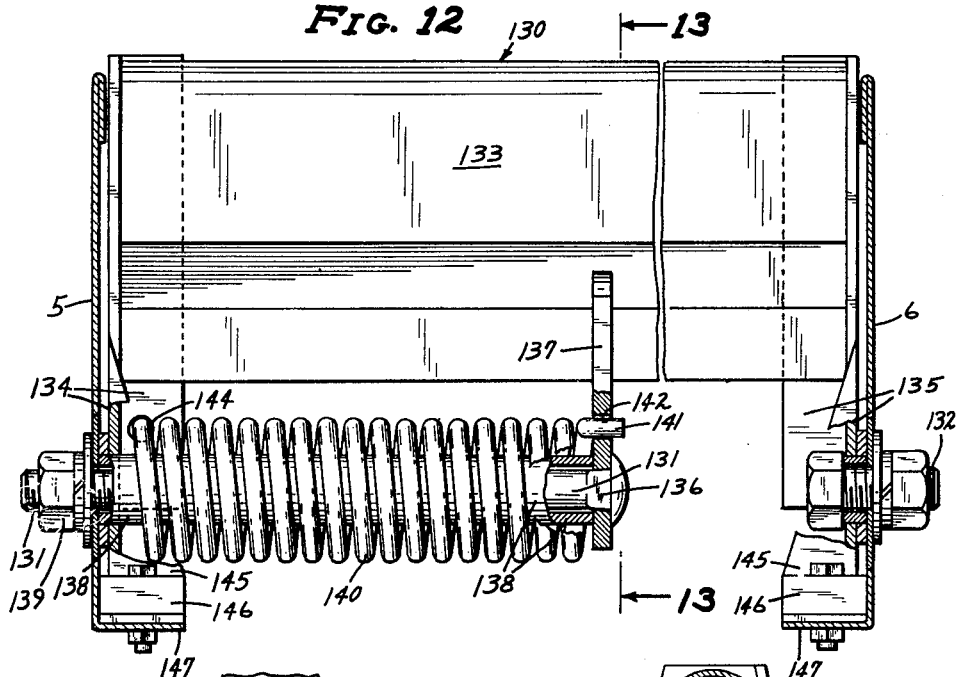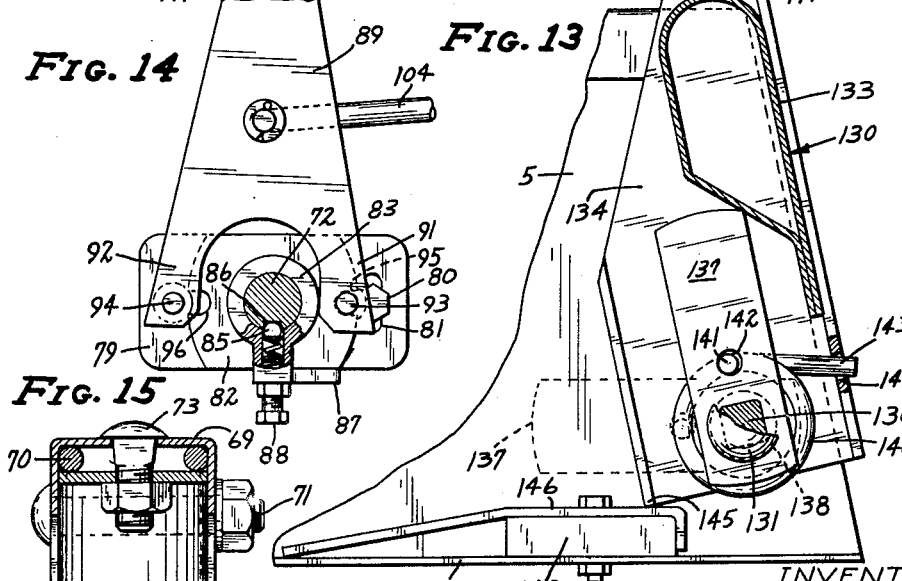

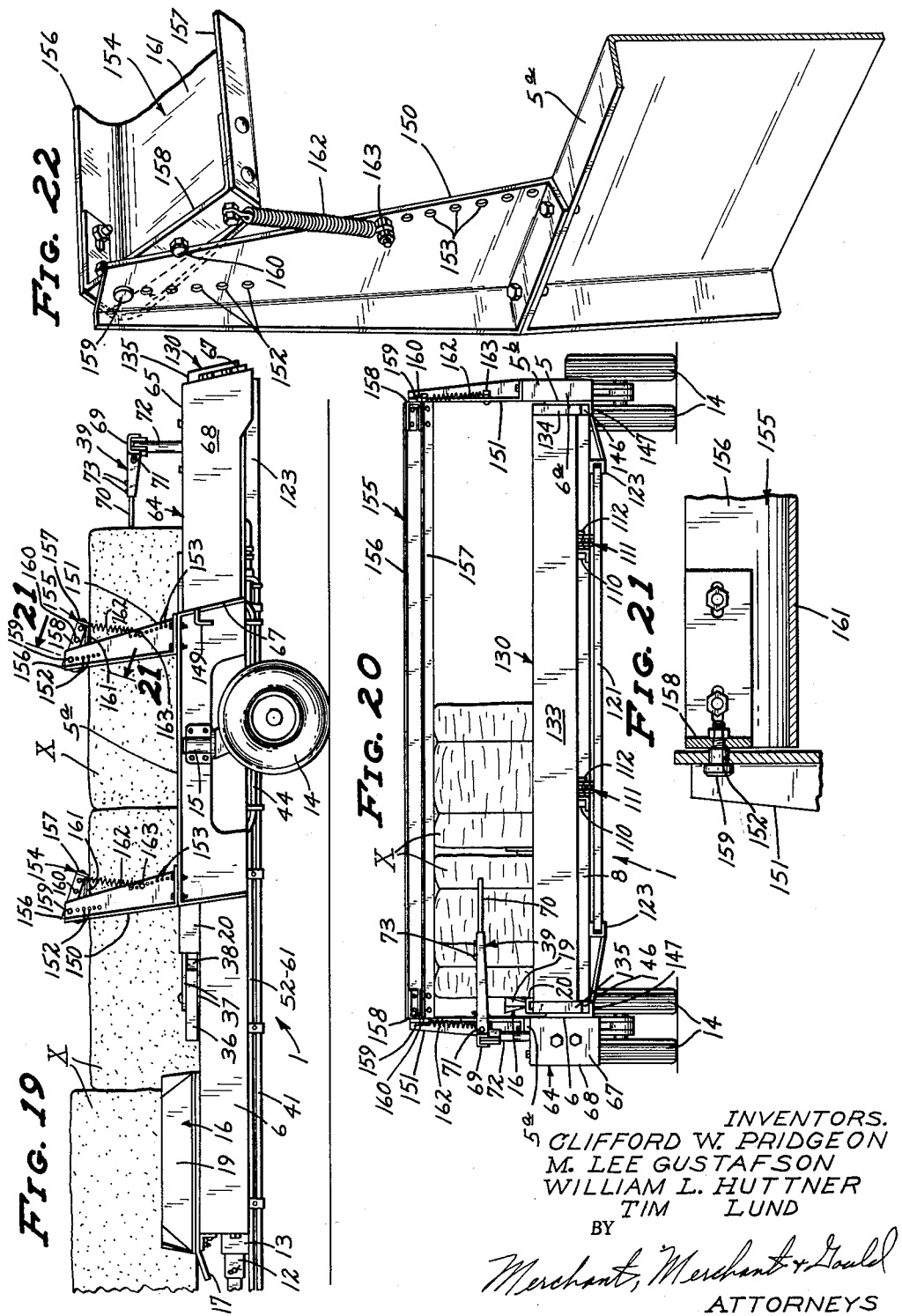

United States Patent Office

3,157,295
Patented Nov. 17, 1964

3,157,295
HAY BALE ACCUMULATOR
Clifford W. Pridgeon, Chinook, Mont., and Merriam Lee Gustafson, Minneapolis, Tim Lund, Excelsior, and William L. Huttner, Minneapolis, Minn., assignors to Daffin Corporation, Hopkins, Minn., a corporation of Delaware
Filed Dec. 19, 1962, Ser. No. 245,903
20 Claims. (Cl. 214—6)

This invention relates to agricultural implements, and more particularly to equipment for handling bales of hay, straw or the like, discharged from baling machines.

More specifically, this invention relates to improvements as disclosed, but not claimed, in the co-pending application for United States Letters Patent, Serial No. 184,218, filed April 2, 1962, and entitled "Hay Bale Accumulator."

This invention involves a bale accumulator which may be used in cooperation with bale loading and stacking devices generally of the type disclosed in the prior United States Letters Patent No. 2,962,117, issued to Clifford W. Pridgeon, wherein a plurality of bales orientated in a pre-arranged group may be picked up and loaded on a vehicle for transport or placed on a stack at a desired location without the necessity for manual lifting or arranging of the bales.

The primary object of this invention is the provision of structural elements and arrangement of parts in a mobile hay bale accumulator which enables the same to arrange collected bales in face-to-face engagement on an accumulator platform, and to automatically move said bales in a group from said platform and deposit said bales in the arranged relationship on the ground without reduction of ground speed of the accumulator, and with a high degree of smoothness and efficiency.

Another object of this invention is the provision of a mobile platform for attachment to a baling machine for common traveling movements therewith and for receiving bales delivered thereto from the baling machine, a reciprocatory transfer bar for moving said bales in the direction transversely of the direction of delivery movement thereof, and novel means including a motor for imparting reciprocatory movement to said transfer bar.

Another object of this invention is the provision of novel means mounted on said transfer bar for common transfer movement therewith and for movements relative thereto, whereby to provide an extension for said transfer bar during bale transferring movement thereof and movable out of the way of a bale being delivered from the baling machine during return movement of the transfer bar.

A still further object of this invention is the provision of an accumulator of the type set forth having discharge mechanism for delivering accumulated bales to the ground in the accumulated group arrangement, and including a discharge motor, and novel control means for selectively energizing said discharge motor and the motor of said transfer bar operating means.

Still another object of this invention is the provision of a pair of fluid pressure operated motors for operating the transfer and discharge means, of a single control valve for said motors, and a novel actuating means for said control valve to control said motors selectively.

Yet another object of this invention is the provision of novel means for restraining movement of bales on the accumulator platform in a bale discharging direction, and which will yield under pressure of the bale discharge mechanism to permit the discharge of the bales to the ground.

Another object of this invention is the provision of novel hold-down apparatus for restraining bales from bouncing on the accumulator platform when said accumulator is moved over rough or uneven terrain, but which will not restrict movements of the bales transversely or longitudinally of the platform.

The above, and still further highly important objects and advantages of this invention will become apparent from the following detailed specification, appended claims and attached drawings.

Referring to the drawings, which illustrate the invention, and in which like reference characters indicate like parts through the several views:

FIG. 1 is a view in top plan of a hay bale accumulator made in accordance with our invention, some parts being broken away and some parts being shown in section;

FIG. 2 is a view in side elevation, some parts being broken away and some parts being shown in section;

FIG. 3 is a view in rear elevation, some parts being broken away;

FIG. 4 is an enlarged fragmentary section taken substantially on the line 4—4 of FIG. 1;

FIG. 5 is a fragmentary section taken on the line 5—5 of FIG. 4;

FIG. 6 is an enlarged fragmentary section taken substantially on the irregular line 6—6 of FIG. 1, and inverted, some parts being broken away;

FIG. 7 is an enlarged fragmentary transverse section taken substantially on the line 7—7 of FIG. 1, some parts being broken away;

FIG. 8 is an enlarged fragmentary view partly in section and partly in side elevation, taken on the line 8—8 of FIG. 1;

FIG. 9 is a fragmentary view partly in horizontal section and partly in top plan, taken substantially on the line 9—9 of FIG. 8, some parts being broken away;

FIG. 10 is an enlarged fragmentary section taken substantially on the line 10—10 of FIG. 8;

FIG. 11, sheet 1, is an enlarged fragmentary section taken substantially on the line 11—11 of FIG. 8;

FIG. 12 is an enlarged transverse section taken substantially on the line 12—12 of FIG. 1, some parts being broken away;

FIG. 13 is a transverse section taken substantially on the line 13—13 of FIG. 12;

FIG. 14 is a fragmentary detail, partly in plan and partly in horizontal section, taken on the line 14—14 of FIG. 11;

FIG. 15 is an enlarged fragmentary detail in section taken substantially on the line 15—15 of FIG. 8;

FIG. 16 is a diagrammatic view of the fluid pressure system incorporated in the accumulator;

FIGS. 17 and 18 are views in top plan illustrating the operation of the accumulator in connection with a hay baling machine;

FIG. 19 is a view corresponding generally to FIG. 2 but showing the bale hold-down means of this invention;

FIG. 20 is a view in rear elevation of the machine of FIG. 19;

FIG. 21 is an enlarged fragmentary detail in section, taken on the line 21—21 of FIG. 19; and FIG. 22 is a fragmentary view in perspective of a portion of the hold-down mechanism of this invention.

In the preferred embodiment of the invention illustrated, a mobile platform, indicated in its entirety by the numeral 1, is adapted to be coupled to a commercial mobile hay baling machine 2 for common traveling movements therewith, and for reception of hay bales or the like from the discharge portion 3 of the baling machine 2. The present invention further involves means for arranging the bales in one or more rows on the platform 1, said rows extending transversely thereof, and means responsive to accumulation of a predetermined number of bales in said row or rows, for discharging of the accumulated group of bales to the ground as the platform 1 moves over the field. Preferably, the direction of delivery movement of the group of bales from the platform to the ground is rearwardly with respect to forward movement of the platform 1, the speed of rearward delivery movement of the bales being substantially equal to the speed of forward movement of the platform 1 and baling machine 2, so that the bales are delivered to the ground without unduly disturbing the group arrangement in which the bales were disposed on the platform 1 prior to said rearward delivery thereof.

As shown, the platform 1 comprises a rectangular generally flat top or deck 4, laterally spaced parallel side frame members 5 and 6, a front transverse frame member 7, and a plurality of longitudinally spaced parallel cross frame members 8 which underlie and support the deck 4. The platform 1 is shown as being secured to the hay baling machine 2 by a pair of longitudinally adjustable draft bars or the like 9 and 10, the draft bar 9 being pivotally connected at its rear end to the transverse frame member 7 adjacent the side frame member 5, as indicated at 11, the rear end of the draft bar 10 being pivotally connected to a clevis 12 that is secured to the intermediate portion of the frame member 7 by means of a bracket or the like 13, see particularly FIG. 1. The connections of the draft bars 9 and 10 to the platform 1 permit swinging movement of the platform 1 on a horizontal axis extending generally transversely of the platform 1 so that said platform may easily follow the baling machine 2 over uneven terrain. Preferably, the draft bars 9 and 10 are rigid with the baling machine 2 against horizontal movement transversely of the direction of movement of the baling machine 2, so that the platform 1 partakes of common forward or turning movements with the baling machine 2. The platform 1 is supported intermediate its ends by pairs of caster wheels 14 that are suitably connected to the side frame members 5 and 6 by bearing brackets or the like 15, one of which is shown in FIG. 2.

A bale receiving guide tray 16 includes a bottom member 17 and laterally spaced generally parallel side walls 18 and 19, and is mounted on the side frame member 6 and transverse frame member 7 immediately behind the rearwardly directed discharge portion 3 of the baling machine 2, and in overlying spaced relation to the adjacent portion of the deck 4, for reception of bales from the baling machine 2 and for guiding the bales in a rearward direction on to the deck 4. The tray 16 is adjustable relative to the platform 1, so that the same may be properly placed with respect to the discharge portion of different baling machines, and the side wall 19 is adjustable relative to the opposite side wall 18, whereby to accommodate bales of different widths and to retard the speed of rearward movement of the bales. In the drawings, the bales are indicated by the reference character X, and shown in some of the views by broken lines.

As the baling machine 2 produces bales X, the bales are pushed rearwardly in end-to-end relationship on the deck 4 adjacent the side frame member 6 until the first delivered bale X is disposed at the rear end portion of the platform 1. The first and second delivered bales X are then moved transversely on the deck 4 a distance slightly greater than the width of the bales, so as to be positioned out of the path of travel of oncoming bales from the baling machine. Then, as two more bales in end-to-end relationship are moved onto the deck 4 adjacent the side frame member 6, these, together with the first delivered pair of bales are moved transversely, the operation being repeated until the desired number of bales having been accumulated on the platform. For the purpose of thus moving the bales transversely of the platform 1, an elongated reciprocatory transfer or pusher bar 20 is mounted for movements between a bale receiving position in side-by-side relation to the side frame member 6 and a second or bale transfer position in laterally inwardly spaced parallel relation from its bale receiving position. The transfer bar 20 is secured intermediate its ends to a pair of mounting feet 21 that project upwardly through transverse slots 22 in the deck 4, see particularly FIGS. 1, 6 and 7. The feet 21 are each welded or otherwise rigidly secured at their lower ends to one of a pair of horizontally disposed parallel legs 23 and 24 each of which underlies a different one of the slots 22, and which are connected by cross members 25 and 26 to provide a generally rectangular frame including angular braces 27. The legs 23 and 24, as well as the cross member 25, are preferably in the form of angle iron, the cross member 26 and angle braces 27 being cross sectionally channel-shaped, see particularly FIG. 7. The frame comprising the legs 23 and 24 is supported between adjacent ones of the cross members 8 by rollers that are journalled for rotation on generally vertical axes on the legs 23 and 24, said rollers 28 being received in opposed channel-shaped guide rails 29 welded or otherwise rigidly secured to said cross members 8. The legs 23 and 24, and the transfer bar 20 carried thereby, are yieldingly urged toward the adjacent side frame member 6 by a coil tension spring 30 connected at one end to the cross member 25 and at its opposite end to the side frame member 6, see FIG. 7. Means for imparting bale engaging and transfer movements to the transfer bar 20, against yielding bias of the spring 30, comprises a fluid cylinder 31 which underlies the leg 23 and which is connected at one end to the side frame member 6, and a cooperating piston 32 having a piston rod 33 rigidly secured at its outer end to the adjacent end of the leg 23. A cushioning element or bumper 34 projects outwardly from said adjacent end of the leg 23 and is adapted to engage an abutment element 35 secured to the adjacent cross member 8 to prevent over-travel of the legs 23 and 24 and transfer bar 20.

For the purpose of obtaining engagement of the bales X for the greatest possible portion of the links thereof by the transfer bar 20 when moving the bales transversely on the deck 4, the transfer bar 20 is provided at its front end with an extension member 36 that is pivotally mounted intermediate its ends for rotation on a vertical axis between a pair of vertically spaced fingers 37 projecting forwardly from the front end of the transfer bar 20, see particularly FIGS. 1 and 2. In view of the fact that bales are moving substantially continuously from the baling machine 2 rearwardly toward the platform 1, the possibility exists that a rearwardly moving bale X may impinge against the front end of the transfer bar 20 during its return movement toward the side frame member 6. Engagement of the pivoted extension member 36 by a rearwardly moving bale during retracting movements of the transfer bar 20 will cause the extension member 36 to rotate, as shown in dotted lines in FIG. 17, while the transfer bar 20 moves to its retracted position shown in full lines in FIG. 18. It will be noted that the opposite ends of the extension member 36 are beveled, as indicated at 38 to facilitate passage thereby of a rearwardly moving bale when the transfer bar 20 is in its retracted position.

Bale shifting movement of the transfer bar 20 is controlled by a bale sensing element 39 that is mounted for swinging movements into and out of the path of travel of bales discharged on to the deck 4 from the baling machine 2, and other control mechanism now to be described. With reference to the diagram of FIG. 16, it will be seen that fluid under pressure is introduced to one end of the cylinder 31 from a reservoir 40 through a conduit 41 in which is interposed a pump 42, a valve indicated in its entirety by the numeral 43, and a conduit 44 extending from the valve 43 to the cylinder 31. The valve 43 comprises a valve body 45 and a cooperating axially movable valve spool 46, the spool 46 formed with a plurality of axially spaced lands that cooperate with the valve body 45 to define axially spaced annular passages 47, 48, 49 and 50. The conduit 44 communicates with the annular passage 47 through a port 51 in the valve body 45, and a return line 52 extends from the reservoir 40 to the valve body 45, the same being connected to axially spaced ports 53, 54 and 55. The port 53 is adapted to communicate with the annular passage 47, the port 54 with the annular passages 48 and 49, and the port 55 with the annular passage 50. The conduit 41 communicates with with a pair of axially spaced ports 56 and 57, the former of which is adapted to communicate selectively with the annular passages 47 and 48, and the latter of which is adapted to communicate selectively with the annular passages 49 and 50, responsive to movement of the valve spool 46. A conventional pressure relief valve 58 is interposed in a conduit 59 that is connected at its opposite ends to the conduits 41 and 52 to by-pass the valve 43.

The valve spool 46 is shown in FIG. 16 in a neutral position, wherein fluid is pumped from the reservoir 40 through the conduit 41, both ports 56 and 57 and annular passages 48 and 49 through the port 54 and conduit 52 to the reservoir 40. Further, it will be seen that, with the valve spool 46 in its neutral position, that the conduit 44 from the cylinder 31 is in communication with the reservoir through the ports 51 and 53 and annular passage 47. Movement of the valve spool 46 to the right with respect to FIG. 16 will cause the port 56 to communicate with the port 51 through the annular passage 47, whereby fluid under pressure will be introduced to the cylinder 31 to cause bale shifting movement to be imparted to the transfer bar 20. Then, when the valve spool 46 is returned to its neutral position shown in FIG. 16, the spring 30 will impart return movement to the transfer bar 20 and the piston rod 33 coupled thereto, to cause fluid in the cylinder 31 to be returned to the reservoir through the conduits 44 and 52, their respective ports 51 and 53 and annular passage 47. The fluid pressure system further involves a fluid pressure operated motor 60 that is interposed in a conduit 61 that communicates at one end with a port 62 in the valve body 45, the other end of the conduit 61 leading to the reservoir 40. The port 62 is adapted to communicate selectively with the ports 55 and 57 through the annular passage 50, and a conventional metering valve 63 is interposed in the conduit 61, between the valve 43 and fluid presure operated motor 60. The purpose of the motor 60 and parts driven thereby will be hereinafter described.

The valve 43, motor 60 and linkage operatively connecting the sensing element 39 to the valve 43, are contained within a protective housing 64 having top and bottom walls 65 and 66 respectively, end walls 67, and a side closure plate 68, the housing being welded or otherwise rigidly secured to the outer surface of the side frame member 6 adjacent the rear end of the platform 1. The sensing element or arm 39 comprises a pair of arm sections 69 and 70, the former of which is rigidly secured, as indicated at 71 to the upper end of a vertically disposed shaft 72 that extends downwardly through the top wall box 65 of the housing 64 and suitably journalled therein. The arm section 70 is releasably locked to the arm section 69 by a pair of clamping bolts or the like 73 for longitudinally extensible and retractable adjustment movements of the arm section 70, for a purpose which will hereinafter become apparent. The shaft 72 has welded or otherwise rigidly secured thereto a radially outwardly projecting arm 74 to which is secured one end of a coil tension spring 75, the other end of the spring 75 being connected to the side frame member 6 adjacent the front end portion of the housing 64 by means of an anchoring hook or the like 76, see FIGS. 8 and 9. The spring 75 yieldingly urges the shaft 72 in a direction of rotation counterclockwise with respect to FIGS. 1 and 9, rotation in this direction being limited by engagement of a radial abutment arm 77, fast on the shaft 72, with a stop member 78 bolted or otherwise rigidly secured to the under surface of the top wall 65 of the housing 64. As shown in FIG. 1, when the abutment arm 77 is disposed in engagement with the stop member 78, the sensing element or arm 39 projects angularly forwardly and toward the opposite side of the platform 1, the outer end of the arm section 70 lying in the path of rearward movement of bales X delivered from the baling machine 2. With reference particularly to FIG. 8, it will be noted that the surfaces of the abutment arm 77 and stop member 78 which engage each other are disposed at an oblique angle to the horizontal plane in which the abutment arm 77 rotates in common with rotary movement of the shaft 72. This arrangement provides a dampening effect on the sensing element or arm 39 and shaft 72 when the spring 75 is permitted to move the same to its position of FIG. 1. The lower end portion of the shaft 72 is journalled in a pivot bracket 79 that is adjustably secured to the bottom wall 66 of the housing 64 by nut-equipped screws or the like 80 that extend downwardly through slots 81 in the pivot bracket 79 and through suitable openings in the bottom wall 66. A horizontally disposed pivot arm 82 overlies the pivot bracket 79, and is provided with a central boss 83 which rotatably receives the shaft 72. The boss 83 is formed with a radially outwardly projecting lug 84 in which is mounted a pair of spring pressed ball detents 85 that are adapted to be received in an axially extended radially outwardly opening recess 86 in the shaft 72, see particularly FIG. 10, whereby rotary movement of the shaft 72 imparts like rotary movement to the pivot arm 82. As further shown in FIGS. 10 and 14, rotary movement of the pivot arm 82 in one direction is limited by an upstanding stop finger 87 integrally formed with the pivot bracket 79. Pressure of the ball detents 85 against the shaft 72 is regulated by nut-equipped adjustment screws or the like 88. A plate-like shifter fork 89 is pivotally secured at one end to the valve spool 46, as indicated at 90, and terminates at its other end in spaced legs 91 and 92 which straddle the boss 83 immediately above the pivot arm 82. The legs 91 and 92 of the shifter fork 89 are provided with depending pins 93 and 94 respectively, that are adapted to be received in respective ones of pairs of radially outwardly opening notches 95 and 96 in the opposite ends of the pivot arm 82, responsive to shifting movements of the shifter fork 89 about the axis of the pivotal connection 90 thereof to the valve spool 46.

When the shifter fork 89 is shifted to its position of FIG. 14, with the pin 93 received in the notch 95, bale imparted rotary movement of the sensing arm 39 and shaft 72, in a clockwise direction with respect to FIGS. 1 and 14, will cause the valve spool 46 to be moved to the right with respect to FIG. 16, whereby fluid under pressure flows from the pump 42 to the cylinder 31, to the conduit 41, port 56, annular passage 47, port 51 and conduit 44. With the valve spool 46 thus moved, the annular passage 49 is in register with the port 57, but is out of register with any other port in the valve body 45. Hence, no fluid flow exists through the port 57. It will be noted that, should bale imparted angular movement of the sensing arm 39 and shaft 72 be greater than that of the pivot arm 82, the ball detents 85 will be radially outwardly of the recess 86 to permit such excess angular movement to be imparted to the sensing arm 39. Flow of fluid under pressure to the cylinder 31, causes the transfer bar 20 to shift the bales X laterally, until the bale which engages the sensing arm 39 moves beyond the free end of the arm section 70 thereof. This done, the spring 75 causes the shaft 72 to be rotated to bring the sensing arm 39 to its position of FIG. 1, the pivot arm 82 moving the valve spool 46 to its neutral position, thus permitting fluid to flow from the cylinder 31 to the reservoir 40 through the valve 43. Inasmuch as the sensing arm 39 cannot return to its position of FIG. 1 until disengaged by a bale X, the amount of bale shifting movement of the transfer arm 20 is determined by the length of the sensing arm 39. Hence, the length of bale shifting travel of the transfer arm 20 may be adjusted by extending or retracting the sensing arm section 70 and locking the same by means of the locking screws 73.

The shifter fork 89 is normally urged toward a position wherein the pin 93 is received within the notch 95 of the pivot arm 82 by a control device in the nature of an inverted cross sectionally generally U-shaped pressure plate 97 that is pivotally mounted between an adjacent pair of the cross members 8, as indicated at 98 for swinging movements on a horizontal axis extending longitudinally of the platform 1 through an opening 99 in the deck 4. The pressure plate 97 is provided with a transverse flange 100 through which extends a guide rod or the like 101 that is rigidly secured at one end to the side frame member 5, see particularly FIG. 4. An adjustment nut 102 is screw threaded on the intermediate portion of the guide rod 101 and forms an abutment for one end of a coil compression spring 103 which loosely encompasses the guide rod 101 between the adjustment nut 102 and the flange 100 to yieldingly urge the pressure plate 97 in a direction of swinging movement to raise the free end portion thereof above the level of the deck 4 through the opening 99 therein. As shown in FIG. 4, the pressure plate 97 slopes upwardly toward the adjacent side frame member 5 so as to be pressed downwardly by one of the bales X as the bales are moved transversely by the transfer bar 20. An elongated rigid link 104 is pivotally connected at one end to the intermediate portion of the shifter fork 89, the opposite end portion thereof extending through a suitable opening in the transverse flange 100 of the pressure plate 97. Adjustment of the effective length of the link 104 is obtained by a washer-equipped nut 105 that is screw threaded on said other end of the link 104 and which has abutting engagement with one side of the transverse flange 100, see particularly FIG. 5. A second washer equipped nut 106 is screw threaded on said other end of the link 104 in spaced relation to the opposite side of the flange 100, and a coil compression spring 107 encompasses the link 104 between the flange 100 and the nut 106 to yieldingly urge the nut 105 toward engagement with the adjacent side of the flange 100. Preferably, a sleeve 108 is slidably mounted on the link 104 within the spring 107, to prevent said flange 100 from rubbing on the threads of the link 104. The spring 107 yieldingly urges the link 104 in a direction to move the pin 94 of the shifter fork 89 into its cooperating notch 96 in the pivot arm 82 when the pressure plate 97 is depressed by a bale X resting thereupon. Further, the spring 107 permits movement of the pressure plate 97 to an extent greater than that required to shift the shifter fork 89 from its position shown in FIGS. 11 and 14 to a position wherein the pin 94 is received in the notch 96.

The pressure plate 97 cooperates with the sensing arm 39 to control operation of the fluid pressure operated motor 60 and bale impelling or discharging mechanism operated by the motor 60. A horizontally disposed drive shaft 109 is disposed rearwardly of the rear edge of the deck 4 and extends from the motor 60 toward the opposite side frame member 5, the shaft 109 being journalled in spaced bearings 110 suitably mounted on the platform 1. A pair of laterally spaced endless link chains 111 are entrained over sprocket wheels 112 keyed or otherwise rigidly secured to the drive shaft 109 adjacent the bearings 110, the link chains 111 each providing an upper delivery flight 113 which rides on the top surface of the deck 4, and a lower return flight 114 underlying the cross frame members 8, see particularly FIG. 6. The link chains 111 are entrained over idler sprockets 115 that are journalled on stub shafts or bolts 116 mounted in brackets 117 between the front end of the deck and the front frame member 7, see FIGS. 1 and 6. The delivery flights 113 of the chains 111 each move rearwardly with respect to the platform 1 between confining flanges 118 and 119 the former of which are formed to provide ramps 120 that slope upwardly from the level of the deck 4 in the direction of the side frame member 5 or, in other words, in the direction of shifting movement of the bales X as they are moved laterally by the transfer bar 20. The ramps 120 permit the bales X to move easily over the underlying delivery flights of the link chains 111. An elongated bale engaging impeller or push-off bar 121 extends in a direction transversely of the platform 1, and is bolted or otherwise rigidly secured to each of the link chains 111, as indicated at 122, see particularly FIG. 6. During its delivery movement rearwardly over the deck 4, the push-off bar 121 rides on the upper edges of the confining flanges 118. During its return movement from the rear end portion of the platform 1 to the front end portion thereof below the deck 4, the impeller or push-off bar 121 is supported at its opposite ends in opposed longitudinally extending channels or supporting rails 123 that are welded or otherwise rigidly secured to the bottom portions of the cross members 8.

An elongated stop bar 124, preferably made from angle iron or the like, is bolted or otherwise releasably secured to the deck 4 alongside the side frame member 5, by means of nut-equipped bolts or the like 125, see FIGS. 1 and 4. The stop bar 124 is adapted to be adjustably moved transversely of the deck 4 with the bolts 125 extending through apertures 126, or removed altogether from the platform 1, depending upon the width of the bales X to be arranged on the platform 1. FIGS. 17 and 18 show the platform 1 with the stop bar 124 removed.

As the baling machine 2 and platform 1 move forwardly over a field, the platform 1 is subject to jostling or bouncing movement due to irregularities in the terrain, tending to cause the bales X to slide out of position on the deck 4, as the bales are accumulated thereon. Transverse sliding movement of the bales X is restricted by the delivery flights 113 of the link chains 111 and the confining flanges 118 and 119. However, the chains and confining flanges do not overly hinder sliding movement of the bales X in directions longitudinally of the deck 4; and for this reason, longitudinally adjustable stop members 127 are both releasably secured to the front end portion of the deck 4 by nut-equipped bolts or the like 128 that are adapted to be received in selected ones of openings 129 arranged in longitudinally extending rows in the deck 4, see FIG. 1. The stop members 127 limit accidental forward movement of the bales X, out of engagement with the pressure plate 97 and accidental rearward movement of the bales is limited by a tail-gate or the like 130 that extends across the platform 1 rearwardly of the rear edge of the deck 4, and which is pivotally secured at its opposite ends to the frame members 5 and 6 by means of axially aligned nut-equipped pivot bolts 131 and 132. The tail-gate 130 comprises a main body portion 133 and end flanges 134 and 135 through which respective ones of the pivot bolts 131 and 132 extend, see particularly FIG. 12. The bolt 131 is provided adjacent its head with a cross sectionally square shank portion 136 on which is mounted a radially outwardly projecting adjustment arm 137 for common rotation with the bolt 131. A tubular spacer 138 encompasses the bolt 131 between the adjacent arm 137 and the rear end portion of the side frame member 5, the flange 134 of the tail-gate 130 being journalled on the spacer 138. As further shown in FIG. 12, the bolt 131 and adjustment arm 137 are held against rotary movement by a clamping nut or the like 139 screw threaded on the outer end of the bolt 131. A torsion spring 140 has one end 141 extending through an opening 142 in the adjustment arm 137, and its opposite end 143 extending through an opening 144 in the end flange 134 of the tail-gate 130, and yieldingly urges the tail-gate 130 toward a generally upright position shown in FIGS. 6 and 13. Forward swinging movement of the tail-gate 130 is limited by engagement of a lower front edge portion 145 of each of the end flanges 134 and 135 with one of a pair of stop members 146 that are bolted or otherwise rigidly secured to inturned flange portions 147 of respective side frame members 5 and 6, see particularly FIGS. 12 and 13. Rubber-like cushioning blocks 148 are interposed between the stop members 146 and their respective underlying flanges 147 to cushion the impact of the edge portions 145 of the tail-gate end flanges against their respective stop members 146. For adjusting yielding bias of the spring 140, it is only necessary to loosen the clamping nut 139, swing the adjustment arm 137 to a desired position, and re-tighten the clamping nut 139 to hold the adjustment arm 137 in its desired set position. Such adjustment is illustrated by full and dotted line positions of the adjustment arm 137, in FIG. 13.

The speed of bale impelling or push-off movement of the impeller bar 121, as above stated, is regulated by the valve 63 in the fluid motor conduit 61, said speed preferably being equal to the speed of forward movement of the baling machine 2 and platform 1. The valve 63 is provided with a control handle 149 that projects outwardly through a suitable opening in the front wall 67, whereby the speed of the fluid motor 60 may be varied according to differences in forward speed of the platform 1 and baling machine 2.

As the baling machine 2, together with the platform 1 coupled thereto, progresses over a field, the baling machine 2 gathers the hay crop from the field and forms the same into bales X, as above described. The bales are discharged on to the deck 4 from the discharge portion 3 of the baling machine 2 in end to end relationship, each bale pushing a preceding bale rearwardly over the guide tray 16 and toward the sensing arm 39. Rearward movement of the first ejected bale moves the sensing arm 39 from the full line position thereof shown in FIG. 17, to the dotted line position thereof in FIG. 17, whereby to cause movement of the valve spool 46 to the left with respect to FIG. 16. This movement of the valve spool 46 permits fluid under pressure to be introduced to the cylinder 31 to impart bale shifting movement to the transfer bar 20 to cause the sensing arm engaging bale X and the next succeeding bale to be moved transversely of the deck 4 a distance slightly greater than the width of the bales. Also, as above described, as soon as the first delivered bale X moves transversely out of engagement with the sensing arm 39, the spring 75 will move the sensing arm 39 back to its position of FIG. 1 and its full line position of FIG. 17. As more bales are delivered to the deck 4 from the baler 2, they are shifted transversely of the deck 4 by the transfer bar 20 in the same manner as the first delivered pair of bales, the last delivered pair of bales engaging the preceding pair thereof in side-by-side relationship and causing said preceding bales to be moved transversely toward the opposite side frame member 5 or stop bar 124. When a third pair of bales is laterally shifted by the transfer bar 20, shifting movement of all of the bales causes the first delivered bale of the entire group to engage the pressure plate 97 and swing the same downwardly to the level of the deck 4, against the bias of the spring 103. Downward swinging movement of the pressure plate 97 compresses the spring 107 to urge the rigid link 104 in a direction to shift the shifter fork 89 from its position wherein the pin 93 is received in the notch 95 to a position wherein the pin 94 is received in its cooperating notch 96 in the pivot arm 82. It will be noted that, when the pressure plate 97 is initially pressed downwardly, the sensing arm 39 is in a position of its angular movement wherein the notch 96 is out of registration with its cooperating pin 94. With the pressure plate held depressed by the overlying bale X, and when the third pair of bales is moved transversely out of engagement of the rear one thereof with the sensing arm 39, return movement of the sensing arm 39 and pivot arm 82 associated therewith will cause the notch 96 to move into register with the pin 94, whereupon the spring 107 will move the pin 94 into the notch 96 through the link 104 and shifter fork 89. Then, as the first delivered bale X of the fourth pair thereof engages the sensing arm 39 and swings the same in a rearward direction, the valve spool 46 moves from its neutral position of FIG. 16 to the left. This movement of the spool 46 causes the port 55 to be closed and the port 57 to communicate with the port 62 through the annular passage 50 whereby fluid under pressure is delivered to the fluid motor 60 from the pump 42. Operation of the motor 60 causes the link chains 111 to carry the impeller or push-off bar 121 forwardly toward the front end of the platform 1 in the supporting rails 123, upwardly over the sprockets 115 and rearwardly over the deck 4 to engage the front ends of the forwardmost row of bales on the deck 4. Continued rearward movement of the impeller or push-off bar 121 causes the rear ends of the bales of the rearmost row thereof to engage the tail-gate 130 and swing the same rearwardly and downwardly against the bias of the torsion spring 140, whereby to deposit the bales X on the ground rearwardly of the platform 1 without materially disturbing the row arrangement and side-by-side arrangement in which the bales were disposed on the platform 1 prior to discharge thereof.

It will be noted that, as the bales X are being rearwardly discharged from the platform 1, the sensing arm 39 is swung rearwardly by the adjacent bale X to a position shown in FIG. 18, which enables the adjacent bales to pass thereby. When the sensing arm 39 is swung to this position, the ball detents 85 are moved out of the recess 86 to permit extended angular movement of the sensing arm 39 without the necessity of moving the valve spool 46 to the left, with respect to FIG. 16, further than is necessary for operation of the fluid motor 60. As soon as the bales are discharged to the ground, the sensing arm 39 swings back to its position of FIG. 1, and the pressure plate 97 moves to its upwardly sloping position of FIG. 4 in readiness for further accumulation of bales as they are continuously fed to the platform by the baling machine 2. As the sensing arm 39 swings back to its position of FIG. 1, the shaft 72 rotates to again cause reception of the ball detents 85 in the recess 86, whereupon the pivot arm 82 will rotate to bring the valve spool 46 to its neutral position of FIG. 16, at which point the lug 84 engages the stop finger 87 to hold the valve spool 46 in said neutral position. It will be further noted that, during rearward discharge movement of the bales X, the pressure plate 97 is disengaged by the bales before the bales disengage the sensing arm 39. Upon release of the pressure plate 97, the spring 103 urges the pressure plate 97 and rigid link 104 in a direction to cause movement of the pin 94 from the notch 96 and movement of the pin 93 into the notch 95. Inasmuch as the notch 95 is out of register with the pin 93, when the sensing arm is swung rearwardly, the discharge motor 60 will continue to operate until all of the bales are discharged and the sensing arm permitted to swing back to its position of FIG. 1. By this time, the impeller or push-off bar 121 has traveled to a point below the level of the deck 4. Return of the sensing arm 39 to its position of FIG. 1 causes the notch 95 to move into register with the pin 93, whereupon the spring 103 moves the pin 92 into the notch 95, placing the valve spool actuator or shifter fork 89 in a position to render the transfer arm 20 operative responsive to engagement of the sensing arm 39 by the next bale X.

It will be appreciated that the dampening effect upon the sensing arm shaft 72 by engagement of the stop members 78 by the abutment arm 77 effectively prevents rebounding of the shaft 72 and accidental operation of the valve 43.

Bolted or otherwise rigidly secured to portions 5a and 6a of the side frame members 5 and 6 respectively are pairs of upstanding front and rear bracket elements 150 and 151 respectively, each thereof having a plurality of vertically spaced mounting apertures 152 at their upper portions, and another row of generally vertically spaced apertures 153 at their lower portions, the rows of apertures 153 being disposed adjacent the rear longitudinal edges of the bracket elements 150 and 151. Each of the apertures 152 in the bracket elements 150 and 151 at one side of the platform 1 is axially aligned with a corresponding one of the mounting apertures 152 in the brackets 150 and 151 at the opposite side of the platform 1.

A pair of elongated, cross sectionally generally U-shaped front and rear hold-down members 154 and 155 respectively, are each formed to provide upstanding front and rear longitudinal walls 156 and 157 respectively, and are provided with opposite end walls 158. The hold-down members 154 and 155 extend transversely between their respective bracket elements 150 and 151 in overlying spaced relation to the deck 4 of the accumulator platform 1, and are pivotally secured to their respective bracket elements by means of pivot bolts or the like 159 that extend through selected ones of the mounting apertures 152 in the bracket elements 150 and 151. It will be noted that the pivot bolts 159 are disposed closely adjacent the upstanding front walls 156 of their respective hold-down members 154 and 155, so that the rear longitudinal edge portions of the hold-down members are adapted for upward and downward swinging movements toward and away from the underlying deck 4. Downward swinging movement of the hold-down members 154 and 155 is limited by stop pins 160 projecting longitudinally outwardly from the end walls 158 in rearwardly spaced relation to the pivot bolts 159, said stop pins engaging the rear edges of their respective bracket elements 150 and 151. The hold-down members 154 and 155 have smooth bottom walls 161 that slidably engage the top surfaces of the bales X as the bales are moved over the deck 4, and the hold-down members 154 and 155 are yieldingly urged in a downward direction of swinging movement thereof into engagement with underlying bales by coil tension springs 162 that are connected at their upper ends to the end walls 158 of the hold-down members. At their lower ends, the springs 162 are adjustably connected to their respective bracket elements 150 and 151 by means of nut-equipped bolts or the like 163 mounted in selected ones of the apertures 153 in the bracket elements 150 and 151. The spring anchoring bolts 163 are located in given ones of the apertures 153 in accordance with the vertical placement of the pivot bolts 159 in their selected apertures 152, and in accordance with the amount of tension under which it is desired to place the springs 162.

With the above arrangement, as bales are delivered to the platform 1, the bales X move rearwardly under the hold-down members 154 and 155, raising the rear longitudinal portions 157 against bias of the springs 162. The hold-down members swing upwardly to permit relatively easy movement of the bales X thereunder, but effectively limit upward movement of the bales X from the deck 4 due to bouncing when the accumulator is moved over rough and uneven terrain.

A feature of the present invention resides in the arrangement whereby an accumulated group of bales is rearwardly discharged to the ground at a speed substantially equal to the speed of forward movement of the platform, to prevent separation of the bales or buckling of adjacent bales in one direction or another, so that the group thereof becomes disarranged. However, it will be appreciated that suitable means may be utilized to prevent disarrangement of the group of bales when said group is rearwardly discharged at speeds other than that of the platform.

It will be further appreciated that the platform 1 may be built to accommodate any desired number of bales in side-by-side relation, or any desired number of rows of said bales, and that the platform herein illustrated and described is but one example.

While we have shown and described a single embodiment of our hay bale accumulator, and have suggested modifications which may be made therein, the same is capable of further modification without departure from the spirit and scope of the invention, as defined in the claims.

What is claimed is:

1. For use with mobile hay baling machines of the type having a discharge portion for delivery of bales from the baling machine,
   (a) a generally horizontally disposed hay bale accumulator platform,
   (b) means for connecting said platform to a baling machine adjacent its discharge portion for common traveling movements therewith,
   (c) a portion of said platform being disposed for reception of bales from said discharge portion,
   (d) bale transfer means for shifting said bales on said platform away from the path of delivery movement thereof from said baling machine to dispose said bales in a predetermined group arrangement,
   (e) discharge mechanism for removing the group of bales from said platform to deposit said bales on the ground in said group arrangement,
   (f) and control means for actuating said bale transfer means responsive to predetermined movement of a bale on said platform from said baling machine discharge portion and for actuating said discharge mechanism responsive to accumulation of a predetermined number of bales on said platform,
   (g) said bale transfer means comprising,
      (1) a reciprocatory transfer member elongated in the direction of delivery movement of bales from said baling machine and movable across the path of delivery movement of said bales toward and away from a normal position at one side of said path of delivery movement,
      (2) means for imparting reciprocatory movement to said transfer member,
      (3) and an elongated extension element rotatably mounted intermediate its ends on a vertical axis to the end of said transfer member nearest the discharge portion of said baling machine, said extension element cooperating with said transfer member during bale shifting movement thereof to shift said bales away from said path of delivery movement and being adapted to be rotated on said axis by a following bale during delivery thereof to said platform and during return movement of said transfer member to its normal position.

2. The structure defined in claim 1 in which the opposite ends of said extension element are disposed in parallel vertical planes oblique to the longitudinal dimension of said extension element.

3. For use with mobile hay baling machines of the type having a discharge portion for delivery of bales from the baling machine,
   (a) a generally horizontally disposed hay bale accumulator platform,
   (b) means for connecting said platform to a baling machine adjacent its discharge portion for common traveling movements therewith, (c) a portion of said platform being disposed for reception of bales from said discharge portion, (d) bale transfer means for shifting said bales on said platform away from the path of delivery movement thereof from said baling machine to dispose said bales in a predetermined group arrangement, (e) discharge mechanism including a motor for removing the group of bales from said platform to deposit said bales on the ground in said group arrangement, (f) and control means for actuating said bale transfer means responsive to predetermined movement of a bale on said platform from said baling machine discharge portion and for actuating said discharge mechanism responsive to accumulation of a predetermined number of bales on said platform, (g) said bale transfer means comprising,
  (1) a reciprocatory transfer member elongated in the direction of delivery movement of bales from said baling machine and movable across the path of delivery movement of said bales toward and away from a normal position at one side of said path of delivery movement,
  (2) and means including a motor for imparting reciprocatory movement to said transfer member, (h) said control means being operatively connected to said motors and including a control element movable between an inoperative neutral position and a pair of operative positions to energize each of said motors respectively.

4. The structure defined in claim 3 in which said control means includes a sensing element disposed in the path of bales delivered from said baling machine, and control element actuating means operatively coupling said sensing element to said control element and responsive to bale imparted movement of said sensing element to move said control element in a direction away from its neutral position to energize the motor associated with said bale transfer means.

5. The structure defined in claim 4 in which said actuating means is shiftable and in which said control means further includes a second bale sensing element mounted on said platform in the path of shifting movement of said bales away from said path of delivery movement thereof, and connections between said second bale sensing element and said actuating means, said second sensing element being responsive to predetermined shifting movement of said bales to shift said actuating means in a direction whereby subsequent bale imparted movement of said first mentioned bale sensing element will impart movement to said control element in a direction to energize the motor of said discharge mechanism.

6. For use with mobile hay baling machines of the type having a discharge portion for delivery of bales from the baling machine, (a) a generally horizontally disposed hay bale accumulator platform, (b) means for connecting said platform to a baling machine adjacent its discharge portion for common traveling movements therewith, (c) a portion of said platform being disposed for reception of bales from said discharge portion, (d) bale transfer means for shifting said bales on said platform away from the path of delivery movement thereof from said baling machine to dispose said bales in a predetermined group arrangement, (e) discharge mechanism for removing the group of bales from said platform to deposit said bales on the ground in said group arrangement, (f) and control means for actuating said bale transfer means responsive to predetermined movement of a bale on said platform from said baling machine discharge portion and for actuating said discharge mechanism responsive to accumulation of a predetermined number of bales on said platform, (g) said bale transfer means comprising,
  (1) a reciprocatory transfer member elongated in the direction of delivery movement of bales from said baling machine and movable across the path of delivery movement of said bales toward and away from a normal position at one side of said path of delivery movement,
  (2) yielding means urging said transfer member in one direction of movement thereof,
  (3) power operated mechanism for moving said transfer member in the opposite direction against bias of said yielding means,
  (4) and a fluid pressure circuit including a source of pressure, and a fluid pressure cylinder and a cooperating plunger rod, one of which is anchored to said platform and the other of which is connected to said transfer member, (h) said control means including a valve in said circuit and having a valve element movable between an inoperative neutral position and a pair of spaced operative positions, and valve actuating means interconnecting said valve element and said bale sensing means and operative responsive to movement of said sensing means to move said valve element to one of said operative positions thereof to introduce fluid under pressure to said cylinder.

7. The structure defined in claim 6 in which said valve actuating means is shiftable, and in which said discharge mechanism includes a fluid pressure operated motor, said control means including a second sensing element mounted on said platform in the path of shifting movement of said bales away from the path of delivery movement thereof, and connections between said second bale sensing element and said valve actuating means, said second sensing element being responsive to predetermined shifting movement of said bales to shift said valve actuating means in a direction whereby subsequent bale imparted movement of said first mentioned bale sensing element will impart movement to said valve element in a direction to introduce fluid under pressure to said fluid pressure operated motor.

8. For use with mobile hay baling machines of the type having a discharge portion for delivery of bales from the baling machine, (a) a generally horizontally disposed hay bale accumulator platform, (b) means for connecting said platform to a baling machine adjacent its discharge portion for common traveling movements therewith, (c) a portion of said platform being disposed for reception of bales from said discharge portion, (d) bale transfer means for shifting said bales on said platform away from the path of delivery movement thereof from said baling machine to dispose said bales in a predetermined group arrangement, (e) discharge mechanism including a motor for removing the group of bales from said platform to deposit said bales on the ground in said group arrangement, (f) and control means for actuating said bale transfer means responsive to predetermined movement of a bale on said platform from said baling machine discharge portion and for actuating said discharge mechanism responsive to accumulation of a predetermined number of bales on said platform, (g) said bale transfer means comprising,
  (1) a reciprocatory transfer member elongated in the direction of delivery movement of bales from said baling machine and movable across the path of delivery movement of said bales toward and away from a normal position at one side of said path of delivery movement,
  (2) and means including a motor for imparting reciprocatory movement to said transfer member, (h) said control means being operatively connected to said motors and comprising, (1) a control element movable between an inoperative neutral position and a pair of operative positions to energize each of said motors selectively, (2) a sensing element disposed in the paths of bales delivered from the baling machine and including a shaft journalled in said platform for rocking movements on its own axis, (3) an actuating element mounted for limited shifting movements relative to said shaft, (4) and connections between said shaft and said actuating element for moving said control element between its neutral position and a selected one of said operative positions to energize a selected one of said motors responsive to bale-imparted movement of said sensing element and in accordance with the positioning of said actuating element relative to said shaft.

9. The structure defined in claim 8 in further combination with yielding means urging said actuating element toward one limit of shifting movement thereof, and means including a second sensing element mounted on said platform in the path of shifting movement of said bales away from said path of delivery movement thereof for shifting said actuating element toward the other limit of shifting movement thereof against bias of said yielding means.

10. The structure defined in claim 9 in which the connections between said shaft and actuating element include cooperating pairs of spaced inter-engageable portions on said shaft and said actuating element, one of said pairs of portions being interengaged and the other pair thereof being disengaged responsive to shifting movements of said actuating element in one direction.

11. The structure defined in claim 10 in further combination with stop means limiting rocking movement of said shaft in one direction, and yielding means urging said shaft in a direction of said rocking movement toward said stop means, said pairs of inter-engageable portions being positioned for inter-engagement when said shaft is disposed at its limit of rocking movement determined by said stop means.

12. The structure defined in claim 8 in which one of said motors comprises a fluid pressure cylinder and cooperating piston plunger, the other of said motors being fluid pressure operated and having a rotary drive shaft, said power operated and discharge mechanisms further including a fluid pressure circuit involving said motors and a source of fluid pressure, said control means comprising a fluid valve in said circuit, said control element being in the nature of a movable valve spool.

13. The structure defined in claim 12 in which said actuating element comprises a shiftable member connected at one end portion to said valve spool for common movements therewith and for shifting movements relative thereto, the opposite end portion of said shiftable member straddling a portion of the shaft of said first-mentioned sensing element for said inter-engagement with spaced portions thereof.

14. For use with mobile hay baling machines of the type having a discharge portion for delivery of bales from the baling machine, (a) a generally horizontally disposed hay bale accumulator platform, (b) means for connecting said platform to a baling machine adjacent its discharge portion for common traveling movements therewith, (c) a portion of said platform being disposed for reception of bales from said discharge portion, (d) bale transfer means for shifting said bales on said platform away from the path of delivery movement thereof from said baling machine to dispose said bales in a predetermined group arrangement, (e) discharge mechanism for removing the group of bales from said platform to deposit said bales on the ground in said group arrangement, (f) control means for actuating said bale transfer means responsive to predetermined movement of a bale on said platform from said baling machine discharge portion and for actuating said discharge mechanism responsive to accumulation of a predetermined number of bales on said platform, (g) said bale transfer means comprising, (1) a reciprocatory transfer member elongated in the direction of delivery movement of said bales from said baling machine and movable across the path of delivery movement of said bales toward and away from a normal position at one side of said path of delivery movement, (2) and means for imparting reciprocatory movement to said transfer member, (h) a stop member extending transversely of said platform, (i) means mounting said stop member adjacent the rear end of said platform for limited movements between an operative bale stopping position in the path of discharge movement of bales on said platform and a release position displaced from said path of discharge movement, (j) and yielding means urging said stop member in a direction of said movement toward said path of discharge movement of the bales, (k) said bales being responsive to operation of said discharge mechanism to move said stop member out of said path of discharge movement against bias of said last-mentioned yielding means.

15. For use with mobile hay baling machines of the type having a discharge portion for delivery of bales from the baling machine, (a) a generally horizontally disposed hay bale accumulator platform, (b) means for connecting said platform to a baling machine adjacent its discharge portion for common traveling movements therewith, (c) a portion of said platform being disposed for reception of bales from said discharge portion, (d) bale transfer means for shifting said bales on said platform away from the path of delivery movement thereof from said baling machine to dispose said bales in a predetermined group arrangement, (e) discharge mechanism for removing the group of bales from said platform to deposit said bales on the ground in said group arrangement, (f) control means for actuating said bale transfer means responsive to predetermined movement of a bale on said platform from said baling machine discharge portion and for actuating said discharge mechanism responsive to accumulation of a predetermined number of bales on said platform, (g) said bale transfer means comprising, (1) a reciprocatory transfer member elongated in the direction of delivery movement of bales from said baling machine and movable across the path of delivery movement of said bales toward and away from a normal position at one side of said path of delivery movement, (2) means for imparting reciprocatory movement to said transfer member, (h) a stop member extending transversely of said platform, (i) means pivotally mounting said stop member adjacent the rear end of said platform for limited swinging movements between an operative bale stopping position in the path of discharge movement of said bales on said platform and a release position angularly displaced from said path of discharge movement, (j) and yielding means urging said member in a direction of said pivotal movement thereof toward said path of discharge movement of the bales, (k) said bales being responsive to operation of said discharge mechanism to pivotally move said stop member out of said path of discharge movement against bias of said yielding means.

16. For use with mobile hay baling machines of the type having a discharge portion for delivery of bales from the baling machine,
  (a) a generally horizontally disposed hay bale accumulator platform,
  (b) means for connecting said platform to a baling machine adjacent its discharge portion for common traveling movements therewith,
  (c) a portion of said patform being disposed for reception of bales from said said discharge portion,
  (d) bale transfer means for shifting said bales on said platform away from the path of delivery movement thereof from said baling machine to dispose said bales in a predetermined group arrangement,
  (e) discharge mechanism for moving the group of bales from said platform to deposit said bales on the ground in said group arrangement,
  (f) control means for actuating said bale transfer means responsive to predetermined movement of a bale on said platform from said baling machine discharge portion and for actuating said discharge mechanism responsive to accumulation of a predetermined number of bales on said platform,
  (g) said bale transfer means comprising,
    (1) a reciprocatory transfer member elongated in the direction of delivery movement of bales from said baling machine and movable across the path of delivery movement of said bales toward and away from a normal position at one side of said path of delivery movement,
    (2) and means for imparting reciprocatory movement to said transfer member,
  (h) and means for holding bales on said platform against bouncing movement thereon, said means comprising,
    (1) a plurality of hold-down members engaging top surface portions of bales on said platform,
    (2) and means mounting said hold-down members in upwardly spaced relation to said platform and in overlying relationship to said bales,
    (3) said hold-down members being yieldingly urged into engagement with said bales and having smooth bale-engaging surface portions permitting free transfer and discharge movement of said bales on said platform.

17. For use with mobile hay baling machines of the type having a discharge portion for delivery of bales from the baling machine,
  (a) a generally horizontally disposed hay bale accumulator platform,
  (b) means for connecting said platform to a baling machine adjacent its discharge portion for common traveling movements therewith,
  (c) a portion of said platform being disposed for reception of bales from said discharge portion,
  (d) bale transfer means for shifting said bales on said platform away from the path of delivery movement thereof from said baling machine to dispose said bales in a predetermined group arrangement,
  (e) discharge mechanism for removing the group of bales from said platform to deposit said bales on the ground in said group arrangement,
  (f) control means for actuating said bale transfer means responsive to predetermined movement of a bale on said platform from said baling machine discharge portion and for actuating said discharge mechanism responsive to accumulation of a predetermined number of bales on said platform,
  (g) said bale transfer means comprising,
    (1) a reciprocatory transfer member elongated in the direction of delivery movement of bales from said baling machine and movable across the path of delivery movement of said bales toward and away from a normal position at one side of said path of delivery movement,
    (2) and means for imparting reciprocatory movement to said transfer member,
  (h) and means for holding bales on said platform against bouncing movement thereon, said means comprising,
    (1) a plurality of elongated hold-down members extending transversely of said platform and having surface portions for engagement with top surface portions of said bales,
    (2) supporting means mounting said hold-down members in overlying spaced relation to said platform for limited movements toward and away from said platform,
    (3) yielding means urging said hold-down members downwardly toward engagement thereof with bales on said platform,
    (4) and stop means limiting said movement of said hold-down members toward said platform.

18. The structure defined in claim 17 in which said supporting means comprises upstanding bracket elements at opposite sides of said platform, and means pivotally mounting said hold-down members on said bracket elements on horizontal axes extending longitudinally of said hold-down members and vertically adjustable on said bracket elements to accommodate bales of various vertical dimensions, said stop means comprising hold-down member engaging stop elements generally vertically adjustably mounted on different ones of said bracket elements.

19. For use with mobile hay baling machines of the type having a discharge portion for delivery of bales from the baling machine,
  (a) a generally horizontally disposed hay bale accumulator platform,
  (b) means for connecting said platform to a baling machine adjacent its discharge portion for common traveling movements therewith,
  (c) a portion of said platform being disposed for reception of bales from said discharge portion,
  (d) bale transfer means for shifting said bales on said platform away from the path of delivery movement thereof from said baling machine to dispose said bales in a predetermined group arrangement,
  (e) discharge mechanism for removing the group of bales from said platform to deposit said bales on the ground in said group arrangement,
  (f) and control means for actuating said bale transfer means responsive to predetermined movement of a bale on said platform from said baling machine discharge portion and for actuating said discharge mechanism responsive to accumulation of a predetermined number of bales on said platform, and comprising,
    (1) a bale engaging sensing element movable from a normal inoperative position in the path of travel of said bales,
    (2) yielding means urging said sensing element toward said normal inoperative position,
    (3) and damping means operatively associated with said sensing element and said platform for preventing rebound of said sensing element upon movement thereof to said normal position thereof,
  (g) said transfer means comprising,
    (1) a reciprocatory transfer member elongated in the direction of delivery movement of bales from said baling macihne and movable across the path of delivery movement of said bales toward and away from a normal position at one side of said path of delivery movement, (2) and means for imparting reciprocatory movement to said transfer member, 20. For use with mobile hay baling machines of the type having a discharge portion for delivery of bales from the baling machine, (a) a generally horizontally disposed hay bale accumulator platform, (b) means for connecting said platform to a baling machine adjacent its discharge portion for common traveling movement therewith, (c) a portion of said platform being disposed for reception of bales from said discharge portion, (d) bale transfer means including a motor for shifting said bales on said platform away from the path of delivery movement thereof from said baling machine to dispose said bales in a predetermined group arrangement, (e) discharge mechanism including a second motor for removing the group of bales from said platform to deposit said bales on the ground in said group arrangement, (f) and control means for actuating said bale transfer means responsive to predetermined movement of a bale on said platform from said baling machine discharge portion and for actuating said discharge mechanism responsive to accumulation of a predetermined number of bales on said platform, said control means being operatively connected to said motors and comprising, (1) a control element movable between an inoperative neutral position and a pair of operative positions to energize each of said motors selectively, (2) a sensing element disposed in the path of bales delivered from the baling machine and including a shaft journalled in said platform for rocking movements on its own axis, (3) an actuating element mounted for limited shifting movements relative to said shaft, (4) connections between said shaft and said actuating element for moving said control element between its neutral position and a selected one of said operative positions to energize a selected one of said motors responsive to bale imparted movement of said sensing element and in accordance with the positioning of said actuating element relative to said shaft, (5) a second sensing element mounted on said platform in the path of shifting movement of said bales away from said path of delivery movement thereof and movable out of said path, (6) a rigid link connected to said actuating element and having an abutment engageable by said second sensing element to impart shifting movement to said actuator in one direction, (7) yielding means urging said second sensing element toward said path of shifting movement of the bales and toward engagement with said abutment, (8) and a spring mounting on said link and disposed to be stressed responsive to bale imparted movement of said second sensing element to urge said link and actuating element in the opposite direction of shifting movement of said actuating element, (g) said bale transfer means comprising, (1) a reciprocatory transfer member elongated in the direction of delivery movement of bales from said baling machine and movable across the path of delivery movement of said bales toward and away from a normal position at one side of said paths of delivery movement, (2) and means for imparting reciprocatory movement to said transfer member.

References Cited in the file of this patent
UNITED STATES PATENTS

| | | |
|---|---|---|
| 1,117,433 | Owens | Nov. 17, 1914 |
| 2,316,435 | James | Apr. 13, 1945 |
| 3,010,593 | Adams et al. | Nov. 28, 1961 |